United States Patent
O'Connell et al.

(10) Patent No.: US 8,335,890 B1
(45) Date of Patent: *Dec. 18, 2012

(54) ASSOCIATING AN IDENTIFIER WITH A CONTENT UNIT

(75) Inventors: Mark O'Connell, Westborough, MA (US); Michael Kilian, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,323

(22) Filed: Nov. 21, 2011

Related U.S. Application Data

(63) Continuation of application No. 12/059,688, filed on Mar. 31, 2008, now Pat. No. 8,095,726.

(51) Int. Cl.
- *G06F 13/00* (2006.01)
- *G06F 13/28* (2006.01)
- *G06F 12/00* (2006.01)
- *G06F 17/30* (2006.01)

(52) U.S. Cl. .............. 711/108; 711/216; 711/E12.06; 707/822; 707/828

(58) Field of Classification Search .......... 711/108, 711/216, E12.06; 707/822, 828
See application file for complete search history.

(56) References Cited

U.S. PATENT DOCUMENTS

| | | | |
|---|---|---|---|
| 6,807,632 B1 | 10/2004 | Carpentier et al. | |
| 6,976,165 B1 | 12/2005 | Carpentier et al. | |
| 7,444,464 B2 | 10/2008 | Urmston et al. | |
| 8,095,726 B1 * | 1/2012 | O'Connell et al. | 711/108 |
| 2004/0236761 A1 | 11/2004 | Both | |
| 2005/0091469 A1 | 4/2005 | Chiu et al. | |
| 2005/0125411 A1 | 6/2005 | Kilian et al. | |
| 2007/0022121 A1 | 1/2007 | Bahar et al. | |

OTHER PUBLICATIONS

U.S. Appl. No. 09/235,146, filed Jan. 21, 1999.

* cited by examiner

*Primary Examiner* — Edward Dudek, Jr.
(74) *Attorney, Agent, or Firm* — Krishnendu Gupta; Robert Kevin Perkins; Joseph D'Angelo

(57) ABSTRACT

Embodiments of the invention relate to associating a source string with a target content unit stored on a content addressable storage (CAS) system. This may be accomplished, in some embodiments, by storing on the CAS system an associative content unit that includes the source string in its binding part and includes the target content unit in its non-binding part.

20 Claims, 7 Drawing Sheets

ASSOCIATING AN IDENTIFIER WITH A CONTENT UNIT

RELATED APPLICATIONS

This application is a continuation of, and claims the benefit under 35 U.S.C. §120 of, U.S. patent application Ser. No. 12/059,688 filed Mar. 31, 2008 and entitled "Associating an Identifier with a Content Unit," the entire contents of which is incorporated herein by reference.

FIELD OF INVENTION

The present application relates to associating an identifier with a content unit stored on a content addressable storage system.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping techniques may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referred to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments OAS systems may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

SUMMARY OF THE INVENTION

One embodiment is directed to a method of retrieving a target content unit stored on a content addressable storage (CAS) system based upon a source identifier associated with the target content unit, wherein the target content unit is identified on the CAS system via a target identifier generated based, at least in part, on the content of the target content unit. The method comprises acts of: (A) receiving a request to access a content unit associated with a source identifier; (B) hashing the source identifier to generate a second content address; (C) retrieving a second content unit identified by the second content address; (D) extracting the target content address from the second content unit; and (E) using the extracted target content address to retrieve the target content unit. Another embodiment is directed to at least one computer readable medium encoded with instructions that, when executed, perform the above-described method.

A further embodiment is directed to at least one content addressable storage system that stores a target content unit that is associated with a source identifier, wherein the target content unit is identified on the at least one CAS system via a target identifier generated based, at least in part, on the content of the target content unit. The at least one CAS system comprises: at least one storage device; and at least one controller, coupled to the at least one storage device, that: receives a request to access a content unit associated with a source identifier; hashes the source identifier to generate a second content address; retrieves a second content unit identified by the second content address from the at least one storage device; extracts the target content address from the second content unit; and uses the extracted target content address to retrieve the target content unit from the at least one storage device.

DETAILED DESCRIPTION

Figure 1:
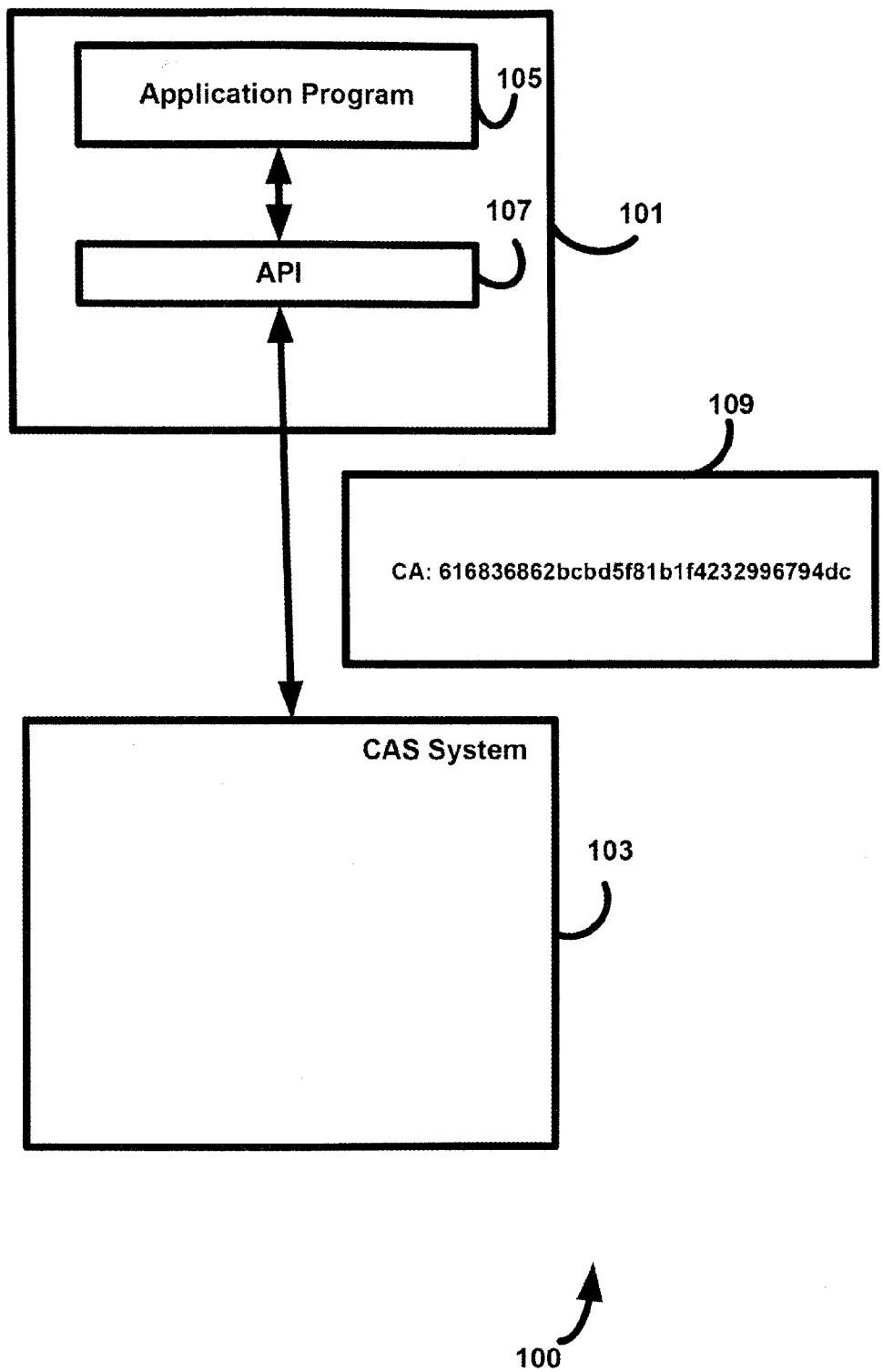
FIG. 1 is a block diagram of a computer system on which some embodiments of the invention may be implemented.

As discussed above, in a content addressable storage (CAS) system, content units are identified using an identifier, referred to herein as a content address, that is generated, at least in part, from at least a portion of the content of the content unit that it identifies. For example, FIG. 1 shows a computer system 100 that includes a host computer 101 which communicates with a CAS system 103. An application program 105 executing on host computer 101 may generate content units and initiate requests to store and access content units. In some embodiments, application program 105 may communicate with CAS system 103 via application programming interface (API) 107.

An API is an interface that supports requests from application programs. That is, for example, API 107 may provide an interface that the application program uses to communicate with CAS system 103. In this way, the application program need not be aware of the details of the protocols used to communicate with the CAS system. Moreover, if it is desired to change these protocols, the application program need not be changed.

Application program 105 may access a content unit stored on CAS system 103 by sending an access request 109 that identifies the requested content unit by it content address. Because a content address is generated, at least in part, using a hashing function, the content address is frequently a long random string. For example, the MD5 hashing algorithm yields a 128-bit hash value, that is frequently expressed as a 26 character hexadecimal string.

Applicants have appreciated that it may be difficult for a human to remember such a string. For example, application program 105 may be a program that backs up a database daily and stores the back-up copy as a content unit on CAS system 103. Each of these content units may have a unique content address that the application program may use to identify it on the CAS system. If it is desired to retrieve one of these stored content units, the user of the application program or the application program itself may determine the content address and initiate an access request to CAS system 103 for the desired content unit.

Applicants have appreciated that it may be desirable for some users to be able to access a content unit with a name that is easy to remember, rather than a long string generated by a hashing function. For example, if application program 105 is a program that backs up a database daily and stores the back-up copy as a content unit on CAS system 103, it may be desirable to associate an easy-to-remember name with each content unit. For example, the identifier db-back-up-Jan17-2007 may be an easy-to-remember name for a content unit that includes a database back-up created on Jan. 17, 2007. Applicants have also appreciated that while associating an easy-to-remember name with a content unit may be desirable for some users, it also desirable to retain the benefits of using content addresses to access content units.

That is, for example, one benefit of using a content address to access a content unit is that the content address may be used to verify that a content unit stored on a CAS system has not been modified or corrupted since storage. That is, because a content address is generated, at least in part, by hashing the content unit at the time of storage, when the content unit is retrieved, the content unit may be hashed again using the same hash function, and it may be determined whether the content unit has changed by comparing the resulting hash value to the content address.

Thus, some embodiments of the invention are directed to associating a source string with a target content unit that may be used to identify the target content unit on a CAS system, while still retaining the ability to use a content address to identify the content unit on the CAS system. This may be done in any suitable way, as the invention is not limited in this respect.

Figure 2:
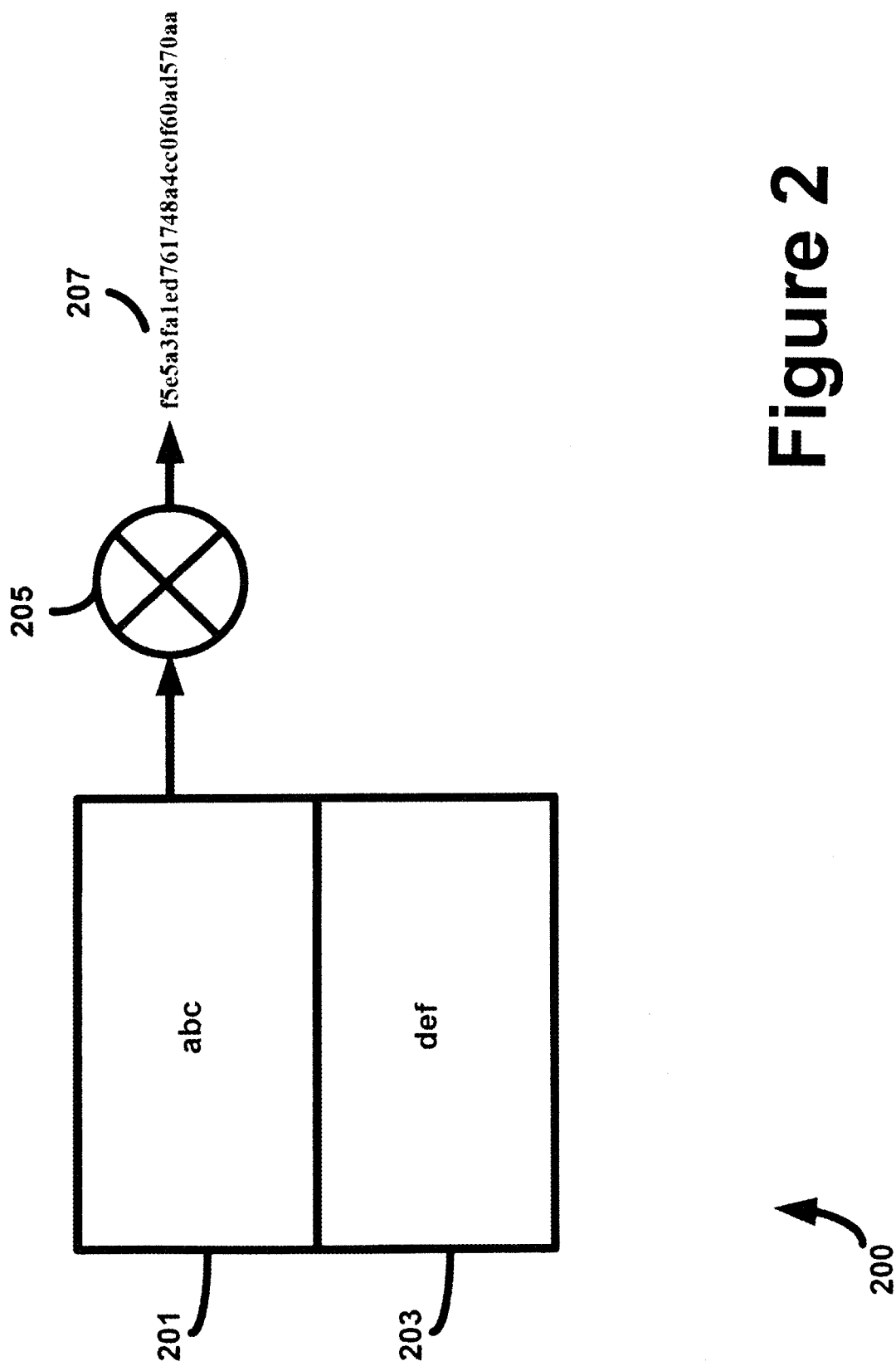
FIG. 2 is a block diagram of a content unit having a binding portion and a non-binding portion, in accordance with some embodiments.

In some embodiments, this may be accomplished using content units having a binding portion and a non-binding portion. A binding portion of a content unit is a portion that contributes to the content address for the content unit, and a non-binding portion is a portion that does not contribute to the content address for the content unit. Thus, for example, the content in the binding portion of the content unit is hashed to generate the content address, whereas the content in the non-binding portion is not hashed. For example, as shown in FIG. 2, content unit 200 has a biding portion 201, which includes the content "abc" and a non-binding portion 203, which includes the content "def." The content of the binding portion is input to hashing function 205, which hashes the content to yield content address 207.

Figure 3:
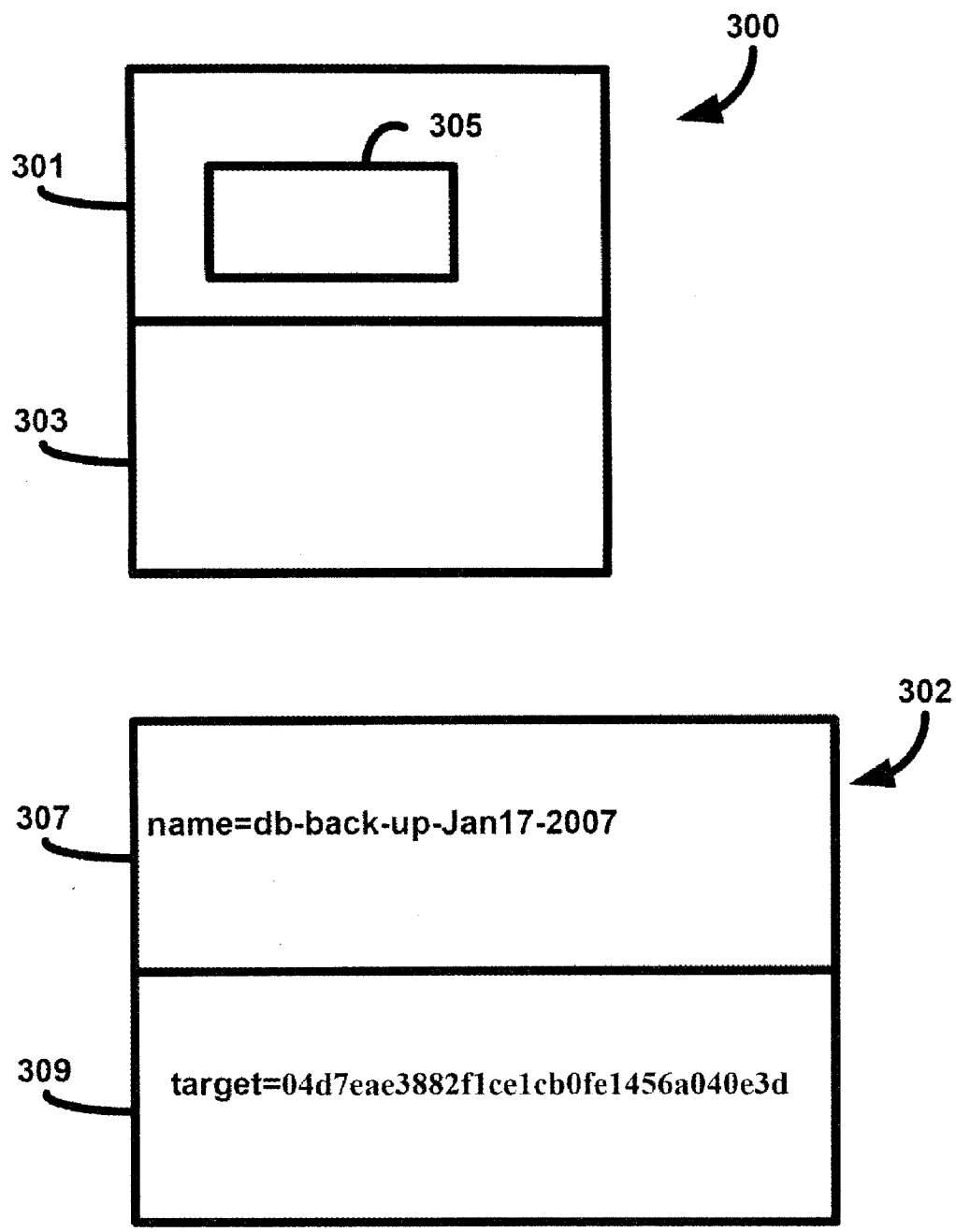
FIG. 3 is a block diagram of a target content unit and an associative content unit that associates a source string with the target content unit, in accordance with some embodiments.

FIG. 3 shows an example of using a content unit having a binding and non-binding part to associate a source string with a target content unit. FIG. 3 depicts two content units: a target content unit 300 and an associative content unit 302. Target content unit 300 is a content unit used to store application data or metadata. For example, an application program that creates daily back-ups of a database may store a copy of the database in a target content unit. Target content unit 300 has a binding part 301 that includes content 305 and a non-binding part 303. Content unit 300 is identified by a content address that is generated, at least in part, by hashing binding portion 301 of the content unit.

Associative content unit 302 is a content unit that is used to associate a source string with content unit 300, and has a binding part 307 and a non-binding part 309. The only content stored in binding part 307 is the key-value pair, "name=db-back-up-Jan17-2007," that specifies the string (i.e., db-back-up-Jan17-2007), that is to be associated with content unit 300. Non-binding part 309 of content unit 302 stores the content address of content unit 300. Content unit 302 is identified by a content address that is generated, at least in part, by hashing binding portion 307 of the content unit.

In embodiments of the invention, any suitable hashing function that is supported by the CAS system may be used in generating content addresses for content units. For example, in some embodiments, the message digest 5 (MD5) hashing algorithm may be used. In other embodiments, the secure hashing algorithm (SHA) 256 may be used. However, these are merely examples of hashing algorithms that may be used, and the invention is not limited to these or any other hashing algorithms.

Figure 4:
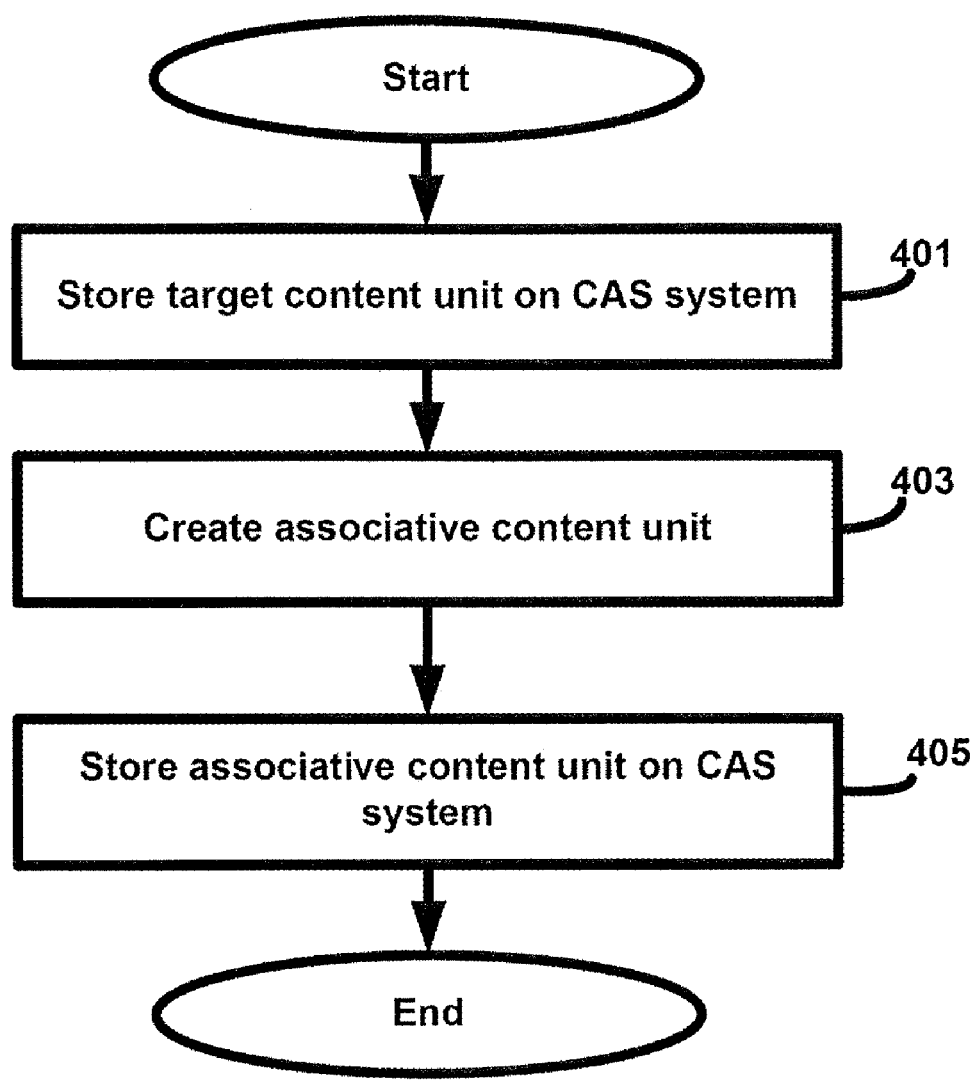
FIG. 4 is a flow chart of an illustrative process for associating a source string with a target content unit, in accordance with some embodiments.

By storing content units 300 and 302 on a CAS system, an association may be created between the source string stored in binding part 307 of content unit 302 and target content unit 300. FIG. 4 shows an example of a process that may be used in some embodiments to create such an association. The process begins at act 401, where a target content unit is stored on a CAS system.

The process next continues to act 403, where an associative content unit is created that includes, in the binding part a source string to be associated with the target content unit, and includes in the non-binding portion the content address for the target content unit. The source string to be associated with the target content unit may be specified in any suitable way, as the invention is not limited in this respect. For example, in some embodiments, an application program that initiated a request to store the target content unit on the CAS system may allow a user (e.g., a human user) to specify the source string.

The process next continues to act 405 where the associative content unit is stored on the CAS system.

The process of FIG. 4 may be performed by any suitable entity in the computer system, as the invention is not limited in this respect. For example, the process may be performed by the host computer, the storage system, or any combination thereof. In some embodiments in which the process of FIG. 4 is performed on the host computer, the process is performed by an application programming interface (API) through which an application program communicates with the CAS system. However, the invention is not limited in this respect, as in embodiments in which the process is performed on the host computer, the process may be performed by an application program, an API, some combination thereof, or any other suitable entity or combination of entities.

In the example of FIG. 3 discussed above, target content unit 300 includes both a binding part and non-binding part. However, the invention is not limited in this respect, as in some embodiments, target content unit 300 need not have a non-binding part. In embodiments in which the target content unit has a non-binding part, the non-binding part may include any suitable content, as the invention is not limited in this respect.

Moreover, in the example of FIG. 3, binding part 307 of content unit 302 includes only a key-value pair indicating the source string to be associated with a content unit. However, the invention is not limited in this respect, as in some embodiments, binding part 307 may include content in addition to this key-value pair. Indeed, any suitable information may be included in binding part 307 so long as this information is predefined and/or reproducible without accessing the content unit. For example, in some embodiments, binding part 307 may include standard header information or any other suitable information. In addition, the source string to be associated with the target content unit need not be stored as a key-value pair, as this string may be stored in any suitable format, and the invention is not limited in this respect. That is, binding part 307 of content unit 302 may have any suitable format including any suitable information, as long as the format and the information included therein is predefined and/or reproducible without accessing the content unit.

Once an association between a source string and a target content unit has been created, the source string may be used to access the target content unit on the CAS system. This may be done in any suitable way, as the invention is not limited in this respect.

Figure 5:
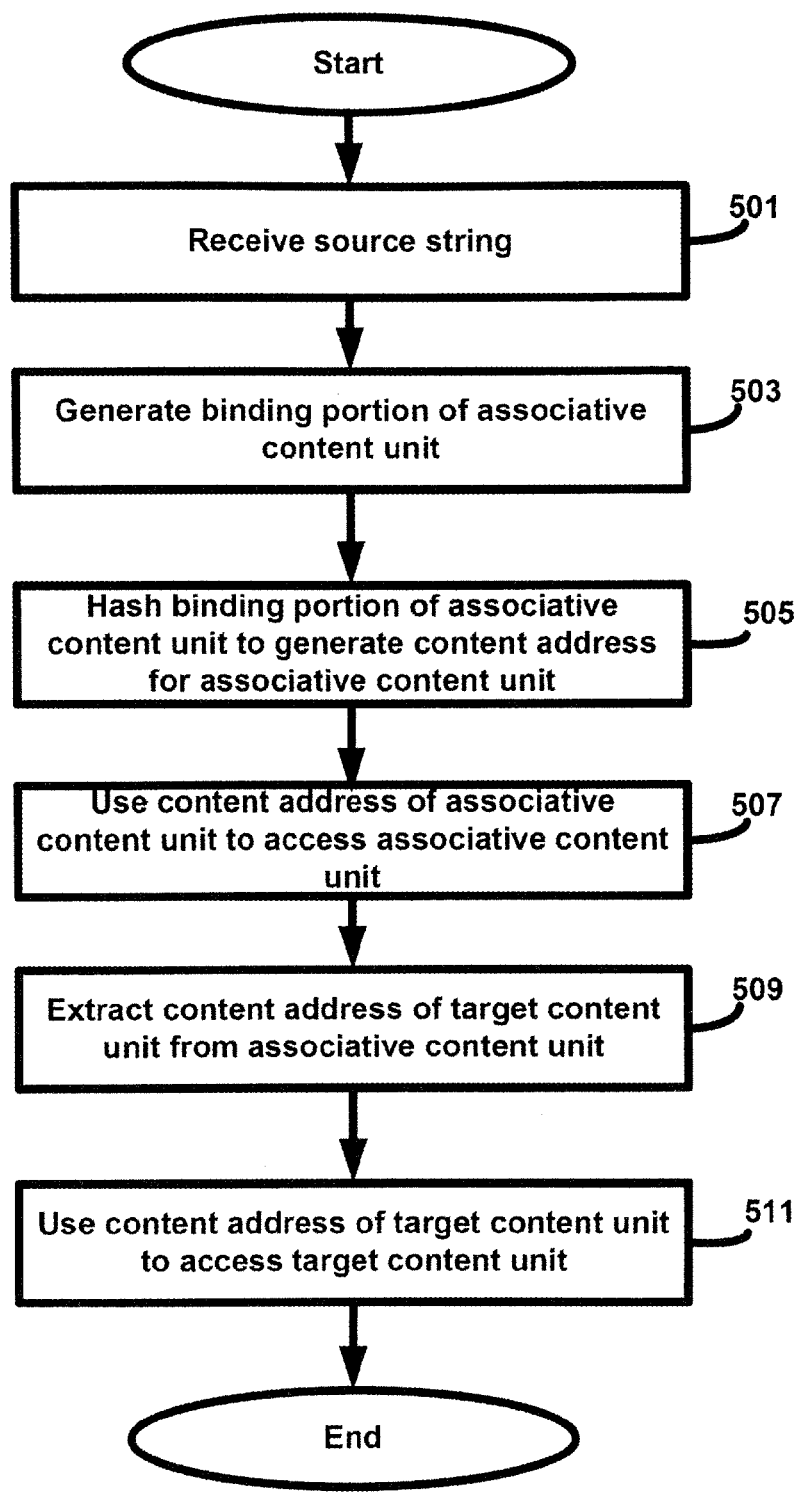
FIG. 5 is a flow chart of an illustrative process for retrieving a target content unit using a source string, in accordance with some embodiments.

FIG. 5 shows an example of a process, for use in some embodiments, for accessing a content unit on a CAS system using a string associated with the content unit. The process begins at act 501, where the string associated with the content unit is received. This may be accomplished in any suitable way, as the invention is not limited in this respect. For example, a user of an application program may initiate a request to retrieve a target content unit stored on the CAS system by indicating the source string associated with the target content unit.

The process next continues to act 503 where the binding portion of the associative content unit is generated. That is, in some embodiments, the binding portion of the associative content unit includes only the source string and, in some situations, additional content that is predefined and/or able to be replicated without accessing the content unit. Thus, if the source string is known, then the binding portion of the associative content unit may be generated without accessing the associative content unit.

The process then continues to act 505 where the binding portion of the associative content unit generated in act 503 is hashed using the same hashing function used to initially generate the content address for the associative content unit. The hash value resulting from hashing this binding portion may be used to determine the content address for the associative content unit.

Once the content address for the associative content unit is determined, the process continues to act 507, where the content address is used to access the associative content unit. For example, in some embodiments, once the content address of the associative content unit is generated, an access request may be sent to the CAS system that identifies the associative content unit by its content address, and the CAS system may return the associative content unit in response to the request.

The process next continues to act 509, where the content address of the target content unit, which is stored in the non-binding portion of the associative content unit, may be extracted from the associative content unit. The process next continues to act 511, where the content address of the target content unit may be used to access the target content unit. For example, in some embodiments, an access request may be sent to the CAS system that identifies the target content unit by its content address, and the CAS system may return the target content unit in response to the request.

The process of FIG. 5 may be performed by any suitable entity in the computer system, as the invention is not limited in this respect. For example, the process may be performed by the host computer, the storage system, or any combination thereof. In some embodiments in which the process of FIG. 5 is performed on the host computer, the process is performed by an application programming interface (API) through which an application program communicates with the CAS system. However, the invention is not limited in this respect, as in embodiments in which the process is performed on the host computer, the process may be performed by an application program, an API, some combination thereof, or any other suitable entity or combination of entities.

Figure 6:
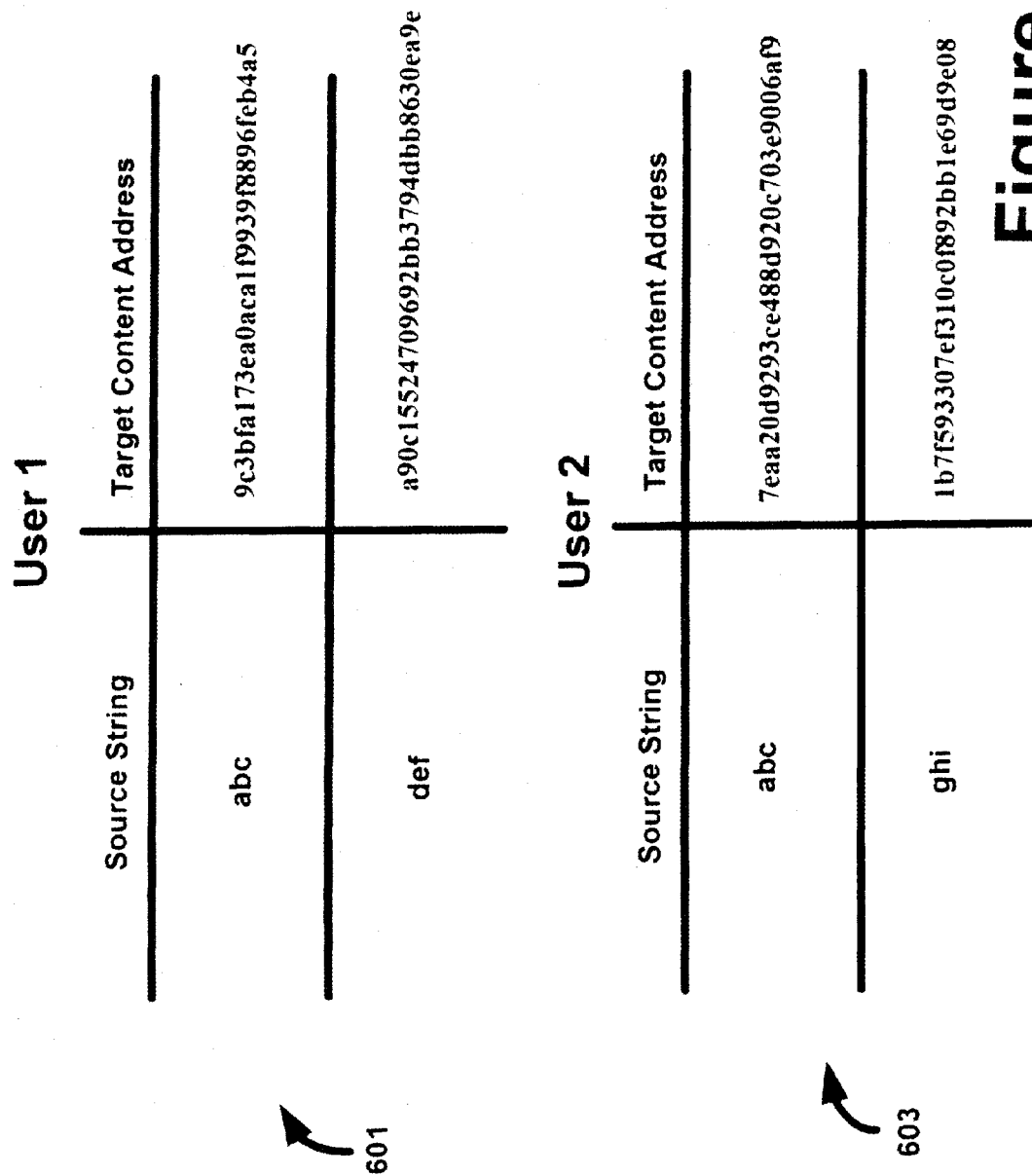
FIG. 6 is a block diagram of associations between source strings and target content units created by different users.

In some situations, it may be desirable to use the same source string to identify different target content units. For example, an application program that is used by multiple different users may allow each user to associate source strings with target content units. In some situations, two different users may wish to use the same source string to identify different content units. For example, FIG. 6 shows associations created by two different users. Table 601 shows the associations created by user 1, and table 603 shows the associations created by user 2. As shown in FIG. 6, user 1 may wish to associate the string "abc" with a content unit having the content address 9c3bfa173ea0aca1f9939f8896feb4a5, while user 2 may wish to associate the string "abc" with the content unit having the content address 7eaa20d9293ce488d920c703e9006af9.

Allowing the same string identifier to be used to identify multiple different content units may be accomplished in any suitable way, as the invention is not limited in this respect.

Figure 7:
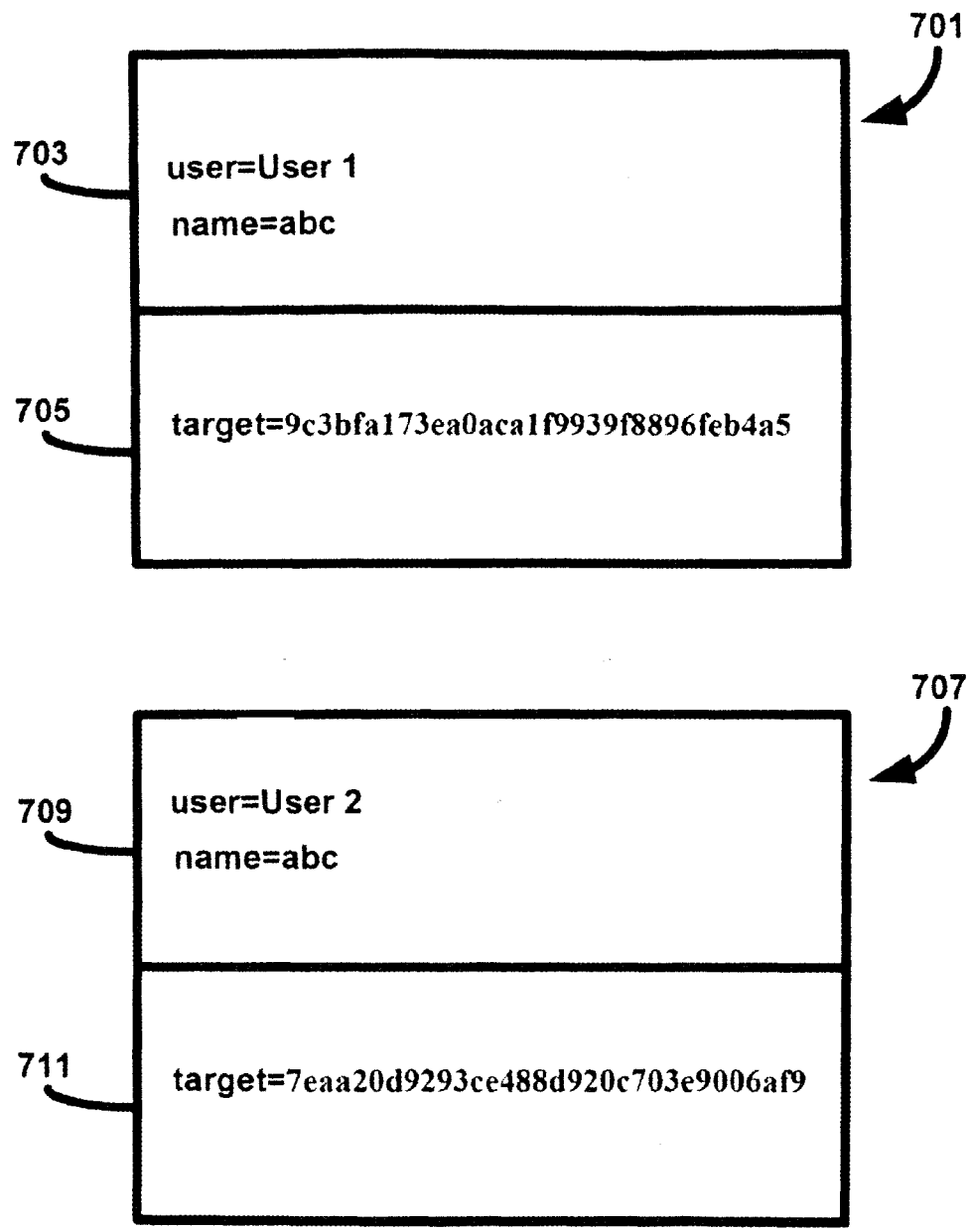
FIG. 7 is a block diagram of two associative content units that associate the same source string with different target content units.

For example, in some embodiments, in addition to specifying the source string in the binding portion of the associative content unit, the user name may also be specified. That is, for example, as shown in FIG. 7, an associative content unit 701 that associates the name "abc" with the content unit having the content address 9c3bfa173ea0aca1f9939f8896feb4a5 may be created that has the user name of user 1 and the source string in binding portion 703, and content address 9c3bfa173ea0aca1f9939f8896feb4a5 in non-binding portion 705. An associative content unit 707 that associates the name "abc" with the content unit having the content address 7eaa20d9293ce488d920c703e9006af9 may be created that has the user name of user 2 and the source string in binding portion 709 and the content address 7eaa20d9293ce488d920c703e9006af9 in non-binding portion 711.

Because the binding portion of these two content units is different, hashing these two content units will, in virtually all cases, yield different content addresses.

To retrieve a content unit using a source string, the binding portion of the associative content unit may be generated without accessing the associative content unit by including both the user name and the source string in the binding portion. This binding portion may then be hashed to determine the content address for the associative content unit.

The above-described embodiments of the present invention can be implemented on any suitable computer, and a system employing any suitable type of storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the aspects of the invention described herein are not limited to being implemented in any particular way.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of operating a content addressable storage (CAS) system, the method comprising:
    storing a target content unit on the CAS system, wherein the target content unit is identified by a first content address based at least in part on content of the target content unit; and
    storing an associative content unit comprising a binding portion and a non-binding portion, wherein:
        the binding portion comprises a string associated with the target content unit;
        the non-binding portion comprises the first content address of the target content unit;
        the associative content unit is identified by a second content address based at least in part on the binding portion of the associative content unit.

2. The method of claim 1, wherein the string associated with the target content unit is received from a user.

3. The method of claim 1, wherein the target content unit and the associative content unit are received from a host computer connected to the CAS system.

4. The method of claim 1, wherein the target content unit is received from a host computer connected to the CAS system and the associative content unit is created by the CAS system.

5. The method of claim 1, wherein:
the binding portion of the associative content unit is a first binding portion;
the content of the target content unit is stored in a second binding portion of the target content unit; and
the first content address is based at least in part on the binding portion of the second binding portion of the target content unit.

6. The method of claim 5, wherein:
the non-binding portion of the associative content unit is a first non-binding portion; and
the target content unit comprises a second non-binding portion.

7. The method of claim 1, wherein:
the first content address is a value that results from hashing the content of the target content unit; and
the second content address is a value that results from hashing the binding portion of the associative content unit.

8. The method of claim 1, wherein storing the associative content unit comprises:
storing the associative content unit on the CAS system.

9. At least one non-transitory computer readable medium encoded with instructions that, when executed, perform a method of operating a content addressable storage (CAS) system, the method comprising:
receiving a string identifying content;
storing a target content unit on the CAS system, the target content unit comprising the content, and the storing comprising generating a first content address for the target content unit using at least the content; and
generating a second content address for an associative content unit using at least the string;
storing the associative content unit comprising a binding portion and a non-binding portion, wherein:
the binding portion comprises the string; and
the non-binding portion comprises the first content address of the target content unit.

10. The at least one non-transitory computer readable medium of claim 9, wherein the target content unit and the associative content unit are received from a host computer connected to the CAS system.

11. The at least one non-transitory computer readable medium of claim 9, wherein the target content unit is received from a host computer connected to the CAS system and the associative content unit is created by the CAS system.

12. The at least one non-transitory computer readable medium of claim 9, wherein:
the binding portion of the associative content unit is a first binding portion;
the content of the target content unit is stored in a second binding portion of the target content unit; and
the first content address is based at least in part on the binding portion of the second binding portion of the target content unit.

13. The at least one non-transitory computer readable medium of claim 9, wherein:
the first content address is a value that results from hashing the content of the target content unit; and
the second content address is a value that results from hashing the binding portion of the associative content unit.

14. The at least one non-transitory computer readable medium of claim 9, wherein storing the associative content unit comprises:
storing the associative content unit on the CAS system.

15. At least one content addressable storage (CAS) system, comprising:
at least one storage device;
at least one controller, coupled to the at least one storage device, that:
stores a target content unit on the CAS system, wherein the target content unit is identified by a first content address based at least in part on content of the target content unit; and
stores an associative content unit comprising a binding portion and a non-binding portion, wherein:
the binding portion comprises a string associated with the target content unit;
the non-binding portion comprises the first content address of the target content unit;
the associative content unit is identified by a second content address based at least in part on the binding portion of the associative content unit.

16. The at least one CAS system of claim 15, wherein the controller receives the string associated with the target content unit from a user.

17. The at least one CAS system of claim 15, wherein the controller receives the target content unit and the associative content unit from a host computer connected to the CAS system.

18. The at least one CAS system of claim 15, wherein:
the binding portion of the associative content unit is a first binding portion;
the content of the target content unit is stored in a second binding portion of the target content unit; and
the first content address is based at least in part on the binding portion of the second binding portion of the target content unit.

19. The at least one CAS system of claim 18, wherein:
the non-binding portion of the associative content unit is a first non-binding portion; and
the target content unit comprises a second non-binding portion.

20. The at least one CAS system of claim 15, wherein:
the first content address is a value that results from hashing the content of the target content unit; and
the second content address is a value that results from hashing the binding portion of the associative content unit.

* * * * *